Patented Mar. 12, 1929.

1,705,332

UNITED STATES PATENT OFFICE.

SHIRLEY A. McDOUGALL, OF INDIANAPOLIS, INDIANA, ASSIGNOR TO DEXTORA COMPANY, OF INDIANAPOLIS, INDIANA, A CORPORATION OF INDIANA.

PROCESS OF MAKING FOOD PRODUCT.

No Drawing.    Application filed June 14, 1927.   Serial No. 198,870.

My invention relates to a process of manufacturing a food product with malted milk and sugar as the principal ingredients, by the use of steam pressure and vacuum, and it is an object of the invention to provide a nutritious, satisfying and easily digestible food product.

In carrying out my process, I employ approximately 85 pounds of malted milk and approximately 15 pounds of powdered cane sugar, and mix the same thoroughly together. To this mixture is added approximately 10% of liquid, which may be all water or part water and part flavoring extract, or the like. In actual practice, I believe that a mixture formed with the above proportions is preferable and insures the best result. The paste formed by the above ingredients is rolled out in sheets about one-fourth as thick as the food cake or bar desired and is cut in pieces of the shape desired and approximately one-half of the length and width desired or, if round, about one-half the diameter desired.

The above mentioned pieces are placed in greased trays having flat, rigid bottoms so that they will lie flat on the heating surfaces. The trays are placed in a vacuum chamber dryer having connections with a vacuum pump and with steam pressure in order to apply 10 pounds of steam pressure and a pull of 27 inches of vacuum. Before the trays are inserted in the dryer the steam pressure of 10 pounds is maintained for a considerable time. The trays containing the dough pieces are placed in this dryer against the heating surfaces and the door is then closed and allowed to stand for about five minutes. Raising of the vacuum in the chamber is then begun and continued at a rate to reach 27 inches in five minutes. After 27 inches vacuum has been reached, the dryer is allowed to remain for fifteen minutes at this vacuum, after which the vacuum is quickly released and the product is complete. The dryer is opened and the bars or cakes are removed.

After the removal of the product from the dryer, the steam pressure within the dryer is maintained at 10 pounds, whereupon more trays of dough pieces may be inserted and the process continued indefinitely, or as long as desired.

Various ingredients may be added in the carrying out of my process, such as nuts, flavoring extracts, and the like. However, the moisture content of the ingredients must necessarily be considered, as I find that the amount of liquid or moisture that is added to the malted milk and sugar is preferably 10% of the combined mass. Also, my bars or cakes may be provided with chocolate and other suitable coatings to make them more palatable and desirable.

Having thus fully described my invention, what I claim as new and desire to secure by Letters Patent, is:

1. A process of making a food product comprising mixing a relatively large amount of malted milk and a relatively smaller amount of powdered sugar, adding sufficient liquid to form a doughy substance, subjecting the mixture to steam pressure, shutting off the steam pressure, and then subjecting said mixture to vacuum pressure, substantially as set forth.

2. A process of making a food product comprising mixing malted milk and powdered cane sugar in the proportion of 85 pounds of malted milk and 15 pounds of the sugar, adding 10% of liquid, subjecting the mixture to a steam pressure of 10 pounds, shutting off the steam pressure, and then subjecting said mixture to a vacuum which is gradually increased to 27 inches in five minutes and continuing the 27 inches of vacuum for fifteen minutes, substantially as set forth.

In witness whereof, I have hereunto set my hand at Indianapolis, Indiana, this ninth day of June, A. D. nineteen hundred and twenty-seven.

SHIRLEY A. McDOUGALL.